United States Patent [19]

Wright

[11] 4,335,380
[45] Jun. 15, 1982

[54] MULTI-BEAM RASTER SCAN DISPLAY MONITOR

[76] Inventor: David Y. Wright, 560 McMunn, South Lyon, Mich. 48178

[21] Appl. No.: 159,570

[22] Filed: Jun. 16, 1980

[51] Int. Cl.³ .............................................. H01J 46/00
[52] U.S. Cl. .................................. 340/744; 340/720; 340/732; 340/745
[58] Field of Search ............... 340/713, 720, 721, 723, 340/732, 733, 736, 744, 745, 748, 749, 750, 796, 798, 799; 315/8.6, 9, 13 R

[56] References Cited

U.S. PATENT DOCUMENTS

| | | | |
|---|---|---|---|
| 2,921,211 | 1/1960 | Toulon | 313/70 |
| 2,978,608 | 4/1961 | Gaffney | 315/22 |
| 3,140,473 | 7/1964 | Gaffney | |
| 3,157,879 | 11/1964 | Kuehler | 346/74 |
| 3,198,976 | 8/1965 | Starr | 313/86 |
| 3,331,985 | 7/1967 | Hamann | 315/13 |
| 3,354,335 | 11/1967 | Corpew | 313/77 |
| 3,358,172 | 12/1967 | Lewis | 313/80 |
| 3,382,392 | 5/1968 | Corpew | 313/69 |
| 3,413,513 | 11/1968 | Donoghue | 315/11 |
| 3,631,456 | 12/1971 | Yokoyama | 315/18 |
| 3,671,957 | 6/1972 | Kegelman | 315/13 R |
| 3,723,786 | 3/1973 | Charles | 313/70 R |
| 3,753,035 | 8/1973 | Veith | 315/31 R |
| 3,819,984 | 6/1974 | Hawken | 315/27 GD |

Primary Examiner—Alvin H. Waring
Attorney, Agent, or Firm—Krass, Young & Schivley

[57] ABSTRACT

A vertically aligned array of electron scanning beams independently modulated by individual sources of video signals are employed to significantly increase display definition in conventional cathode ray tube type monitors. Precise vertical alignment of scanning spots produced by the beam array is achieved by synchronizing the relative timing of the video signals associated with each of the beams using delay circuits. Vertical spacing between the scanning spots produced by the beam array may be selectively adjusted by electrostatic deflection plates. Vertical alignment and vertical spacing of the scanning spots are respectively sensed though the provision of narrow, vertical and diagonal slits in the fluorescent coating of the CRT screen. A photodetector positioned at the rear of the screen produces output signals in accordance with light delivered through the slits as the scanning spots traverse the slits. The relative timing and magnitude of the timing signals are indicative of the vertical alignment and vertical spacing of the scanning spots. Character generation circuitry comprises a plurality of discrete matrix memories which are simultaneously addressed using the same character designation derived from a single refresh memory. Superimposed screen images may be created by using different data sources to modulate the scanning beams in order to generate differing picture fields, each corresponding to an image on the screen.

24 Claims, 16 Drawing Figures

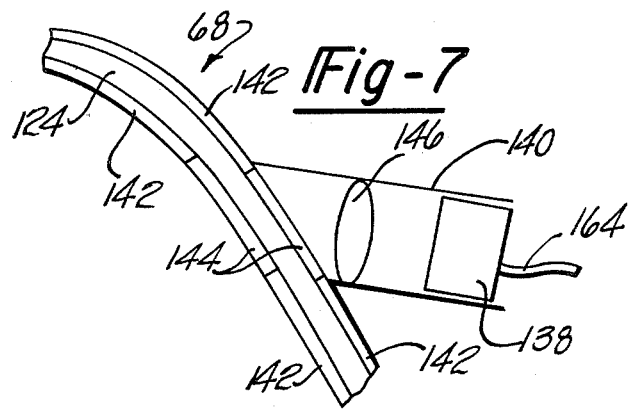
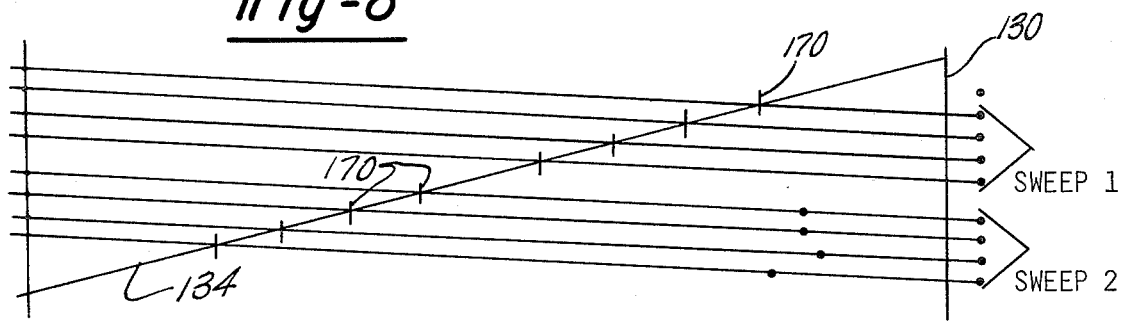
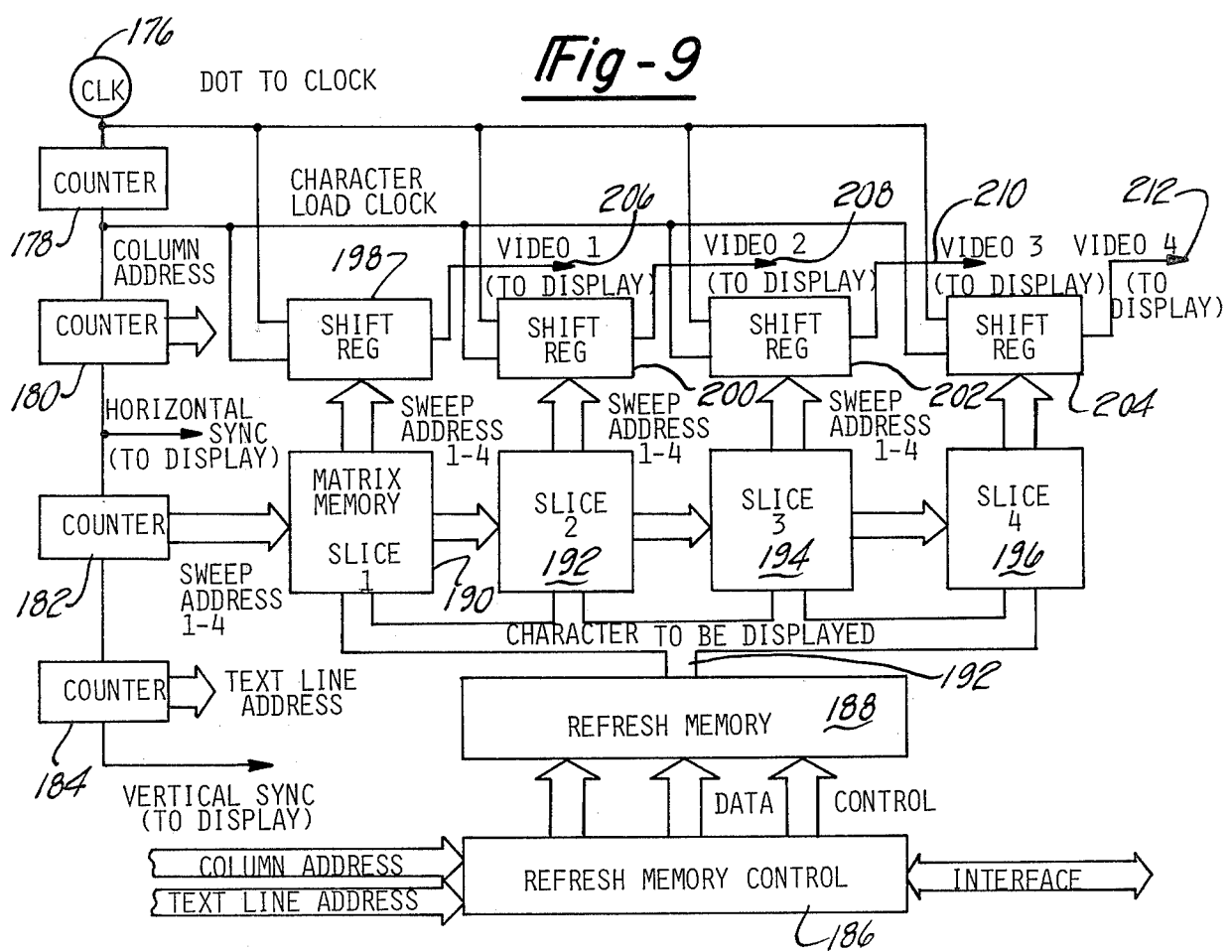

MULTI-BEAM RASTER SCAN DISPLAY MONITOR

TECHNICAL FIELD

The present invention generally relates to raster scan, cathode ray tube type monitors, and deals more particularly with a device implemented method for significantly improving the definition of display images produced by such monitors.

BACKGROUND ART

The use of CRTs (cathode ray tubes) for displaying various types of alphanumeric and pictorial information has increased rapidly during recent years along with the expanding role of computers and data processing equipment. CRT display monitors are finding increasing use particularly in the area of computer generated graphics in which pictorial or graphics information generated by a computer is displayed on the CRT screen for analysis. In many of these applications, particularly those involving graphical analysis, definition of the display image on the screen is less than completely satisfactory.

In connection with conventional television type raster scanning, definition is defined as the number of scanning lines which comprise each picture frame of the image to be displayed. Definition is dependent, in part, on the thinness of each scanning line; current conventional CRT display monitors produce scanning lines having a thickness typically between 0.015 and 0.0075 inches, and state of the art monitors may achieve a line thickness of 0.005 inches. Scanning lines of this thickness are well within the range necessary to produce extremely high definition display images. Definition, as defined above however, does not reflect the total amount of information, i.e. the total number of discrete elements or "pixels" which can be utilized, but rather merely deals with a measure of minimum line width, regardless of the number of lines actually displayed. In contrast, the present invention relates to increasing the overall amount of information which can be displayed; the quality of information density will therefore be hereinafter referred to as image "definition".

Prior art CRT display monitors typically utilize a picture frame comprising 262 non-interlaced lines of image data interlaced to form a picture field. Objectionable flicker occurs at refresh rates below approximately 50 Hz in connection with non-interlaced scanning. Flicker may be eliminated through the use of persistance phosphors, but this approach suffers from certain drawbacks such as decreased image brightness and the tendency to "burn". The deflection yokes employed in conventional monitors for moving the electron beam of the tube across the screen are limited in the rate at which the beam may be moved across each line; currently, the maximum scanning rate of prior art, single beam monitors operating at 60 Hz refresh and using a special deflection yoke and drive circuit is approximately 60,000 lines per second.

Although specially designed CRT monitors of the type having a single scanning beam have, in the past, been adapted to exceed the conventional 15,720 scanning lines per second, such monitors are particularly expensive to produce due to the additional high speed logic and control circuitry required by their design, and in any event such specially designed monitors are not compatible with many computer installations which are based on standard television type formats.

In connection with many types of computer generated and computer aided graphics, it is often necessary to simultaneously display a plurality of superimposed images on the screen which are generated from different data sources. In the past, it has been necessary to provide relatively complex mixing circuits for combining the video signals in a manner which allows a single electron beam to form each of the images to be displayed. This approach to the problem has not gained widespread acceptance because it was relatively expensive in terms of the hardware which was required.

Multiple beam CRTs are known per se in the art, as exemplified by U.S. Pat. Nos. 2,978,608, 3,140,473 and 3,671,957. However, none of these prior patents disclose raster scan type monitors capable of generating high definition images. The device shown in U.S. Pat. No. 2,978,608 is not of a true raster scan type and is not capable of producing grey scales. U.S. Pat. No. 3,671,957 discloses a monitor in which each gun paints different areas of the screen, rather than adjacent lines on the screen.

Accordingly, it is a primary object of the present invention to provide a raster scan type CRT display capable of providing high definition display images, but which is relatively simple in design and is readily compatible with existing data processing and television systems.

Another object of the present invention is to provide a monitor of the type described above which employs a plurality of electron scanning beams in which the associated scanning spots are maintained in precise vertical alignment with each other.

A still further object of the invention is to provide a monitor of the type discussed above which includes provision for adjusting the vertical spacing between the scanning lines.

Another object of the invention is to provide a raster scan display monitor having character generation circuitry comprising a plurality of discrete matrix memories which may be simultaneously addressed using the same character designation.

A further object of the invention is to provide a multi-beam scanning display as discussed above in which each of the beams is controlled by different sets of data sources thereby eliminating the need for special circuitry for mixing signals derived from differing data sources.

DISCLOSURE OF INVENTION

According to the present invention, a vertically aligned array of electron scanning beams simultaneously scan adjacent lines of a cathode ray tube type display monitor in order to significantly increase the definition of the images to be displayed. Each of the beams in the array thereof is independently modulated by separate sources of video signals. The monitor screen is provided with both a vertical and diagonally extending slit in the metalized coating thereon. As the beams traverse the slits during the scanning process, light generated by the layer of fluorescent material registrating with the slits is transmitted rearwardly into the tube and is detected by a photodetector. The photodetector produces a series of electrical signals whose timing and magnitude provide an indication of both the degree of vertical alignment and the scanning spots as well as the vertical spacing between such spots. The scanning spots may be brought into vertical alignment with each other by selectively delaying delivery of video signals to certain of the electron beam guns. Vertical spacing between the scanning spots produced by the beam array may be selectively adjusted by means of electrostatic deflection plates. Simplified character generation circuitry suitable for use in producing alphanumeric characters employs a plurality of discrete, matrix memories for generating the characters which may be simultaneously addressed using the same character designation derived from a single refresh memory. Images derived from separate data sources may be displayed in superimposed relationship on the monitor screen by driving the beams using different video signals such that the images are interlaced on various sets of lines of each picture frame.

BRIEF DESCRIPTION OF THE DRAWINGS

In the drawings, which form an integral part of the specification and are to be read in conjunction therewith and in which like reference numerals are employed to designate identical components in the various views:

FIG. 7 is a sectional view taken along the line 7—7 in FIG. 6;

FIG. 8 is a diagrammatic view showing the traces produced by two successive sweeps of the beam array, in operative relationship to slits in the display screen employed for sensing the relative position of the scanning spots;

FIG. 9 is a simplified, block diagram of a character generating circuit for use with the display of FIG. 1;

BEST MODE FOR CARRYING OUT THE INVENTION

Figure 1:
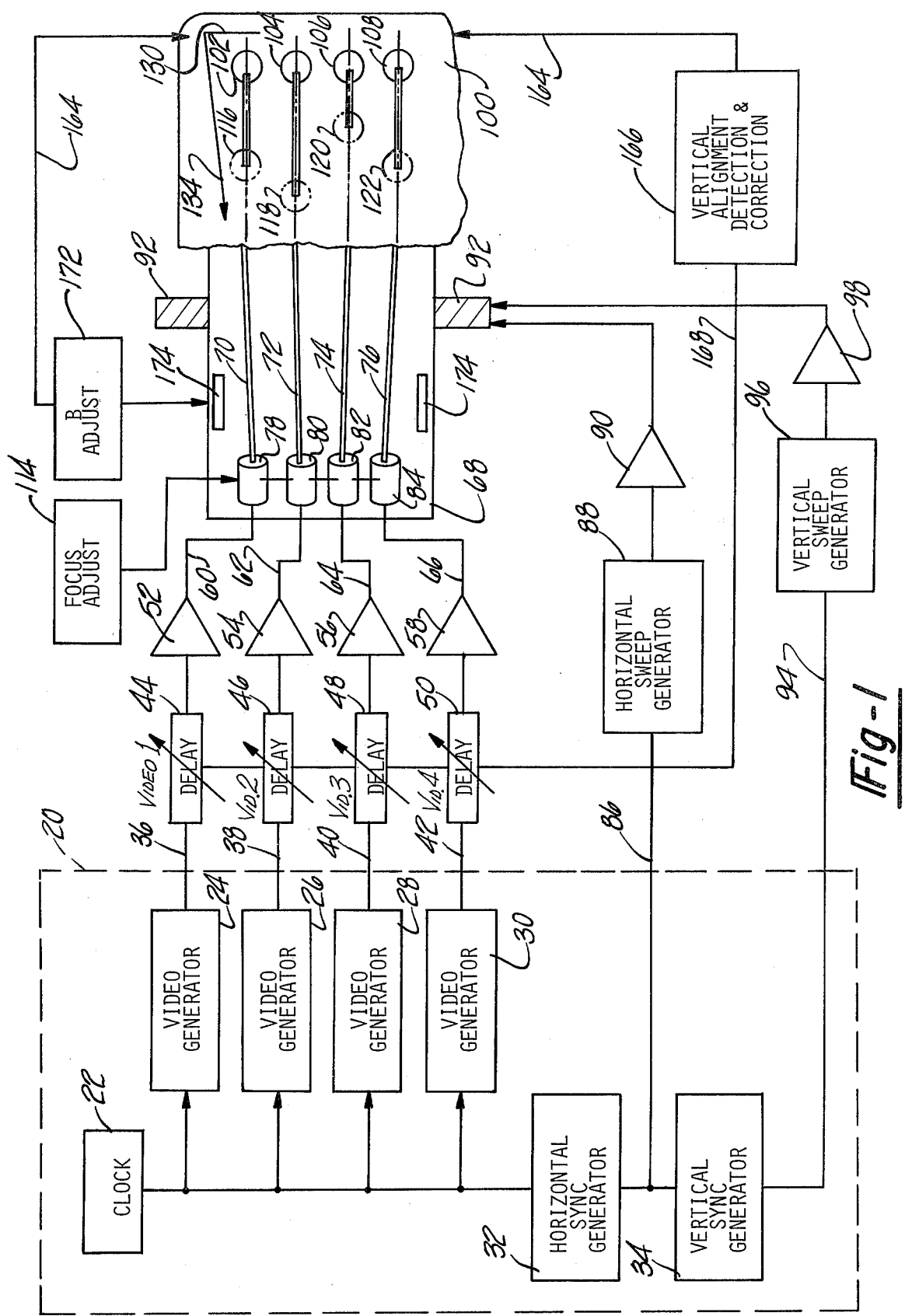
FIG. 1 is a combined diagrammatic and block diagram view of a multi-beam raster scan display monitor which forms the preferred embodiment of the present invention, showing a front view of a portion of the display screen.

Attention is first directed to FIG. 1 wherein the multi-beam raster scan display monitor of the present invention is depicted. The display monitor will typically include means for generating video signals which is generally indicated within the broken line 20 and comprises a clock 22 delivering clock pulses to a plurality of independent circuits for generating video signals, respectively designated by the numerals 24–30, as well as to a horizontal sync signal generator 32, and a vertical sync signal generator 34. It is noted that although separate vertical and horizontal sync lines are shown, the vertical and horizontal sync signals may be combined with one or more video signals and then extracted using a conventional sync separator.

The video signal generators 24–30 have outputs for delivering video signals on respectively corresponding lines 36–42 to the inputs of respectively associated, adjustable delay circuits 44–50 whose construction will be discussed later in more detail. Video generator circuits 24–30 are essentially conventional in design and may be employed for producing video signals from completely independent data sources, as will become clearly apparent hereinafter. Delay circuits 44–50 are each selectively operable for altering the timing of the video signals delivered thereto in order to compensate for timing variations in the respective sets of video signals generated by circuits 24–30. In this manner, the timing of the resulting signals output by delay circuits 44–50 to the respective corresponding amplifiers 52–58 is synchronized. Delay circuits 44–50 may be incorporated as integral parts of the corresponding video amplifiers 52–58 if desired. The synchronized, amplified video signals are delivered via lines 60–66 to a CRT partially indicated by the numeral 68, and more particularly to means for producing a plurality of electron scanning beams 70–76; as shown in FIG. 1, four conventional electron beam guns, 78–84 respectively, operably coupled with lines 60–66 are employed for producing the corresponding scanning beams 70–76. It is to be understood, however, that other methods may be employed for producing the plurality of scanning beams, such as the use of a single cathode to supply a stream of electrons which then may be divided into separate, discrete beams by deflection and focusing devices which are well known in the art.

The horizontal sweep signal produced by horizontal sweep signal generator 88 is synchronized with, or is triggered by the horizontal sync pulse signal, and the resulting signal is amplified by amplifier 90 and delivered to the input of a conventional deflection yoke indicated by the numeral 92. Similarly, a vertical sync signal derived from the vertical sync signal generator 34 is delivered by line 94 to a vertical sweep signal generator 96 thereby synchronizing or triggering a vertical sweep signal. Synchronized sweep signals are then amplified by amplifier 90 and delivered to the inputs of deflection yoke 92.

Deflection yoke 92 functions to deflect the beams 70-76 to produce raster scanning of a display screen 100. Each of the scanning beams 70-76 is modulated to produce formation of images on the screen 100 using the respectively corresponding, synchronized video signals delivered on lines 60-66 to the electron beam guns 78-84.

Figure 2:
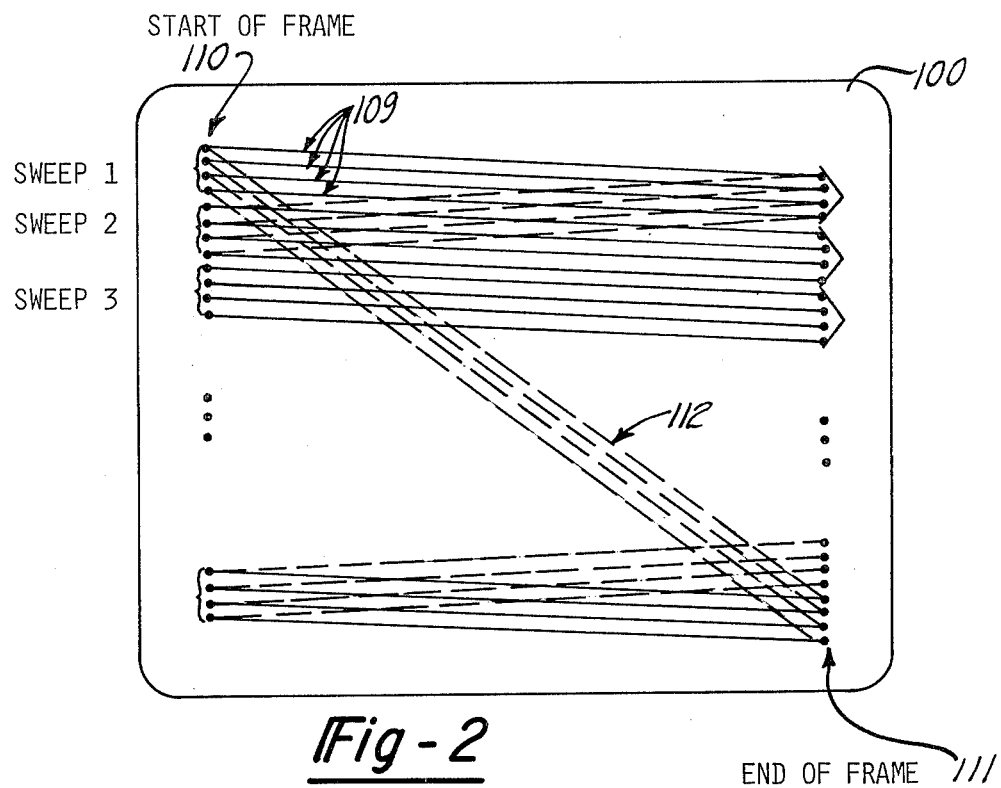
FIG. 2 is a diagrammatic view of the scanning pattern produced by the multi-beam display of FIG. 1.
Figure 3:
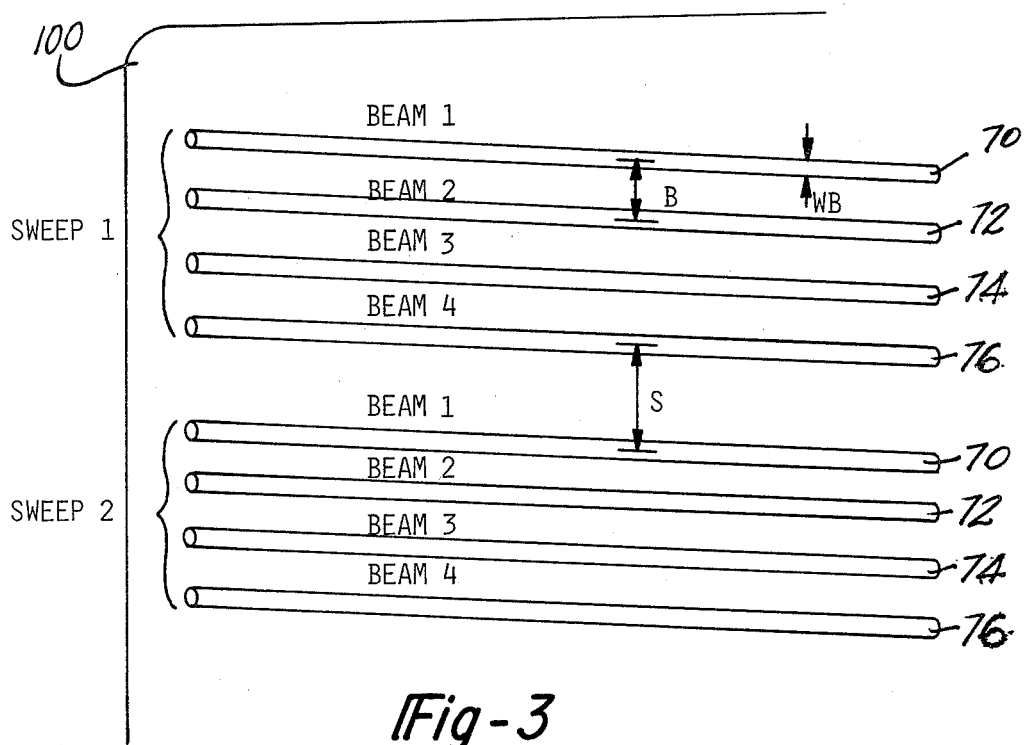
FIG. 3 is an enlarged diagrammatic view of the screen traces produced by two consecutive sweeps of the multi-beam array.

Referring also to FIGS. 2 and 3, the scanning beams 70-76 are adapted to produce vertically spaced scanning spots 102-108 on the display screen 100 which results in a series of four, vertically spaced, parallel, generally horizontal traces 109 upon each sweep of the screen 100 by scanning spots 102-108. As in the conventional television format, scanning may be initiated in the upper left hand corner of the screen 100 at a starting frame 110 and is successively drawn across the screen 100 from left to right and slightly downward until the end of the frame 111 is reached at the lower right hand corner of the screen, at which point the scanning spot array returns along the vertical retrace path 112 to the starting frame 110. The width indicated by the letters "WB" in FIG. 3 of each trace may be altered by varying the diameter of the scanning spots 102-108 using a conventional focusing adjustment which controls each of the electron guns 78-84. The vertical spacing between adjacent traces and each sweep, designated by the letter "B" in FIG. 3, as well as the distance between the traces in adjacent sweeps, designated by the letter "S", may also be readily adjusted in a manner to be described below.

As mentioned previously, the video signals produced by circuits 24-30 are normally not precisely synchronized, partially due to the fact that signal timing may be slightly altered by differences in the values of components in the respective circuits. Thus, in the absence of any provision for synchronizing the video signals, the timing of the modulation of scanning beams 70-76 may not be synchronized; the effect of the variation in the timing of the video signals is manifested in a lack of vertical alignment of the scanning spots 102-108. Consequently, the scanning spots 102-108 are horizontally displaced from each other to positions (shown for illustrative purposes by broken lines) designated by the numerals 116-122. Distortions in the deflection of the scanning beams 70-76 as a result of imperfect deflection geometry and the like also significantly contributes to the lack of vertical alignment of the scanning spots. This lack of vertical alignment of the scanning spots results in a blurred, distorted display image which significantly reduces picture resolution and quality.

Figure 6:
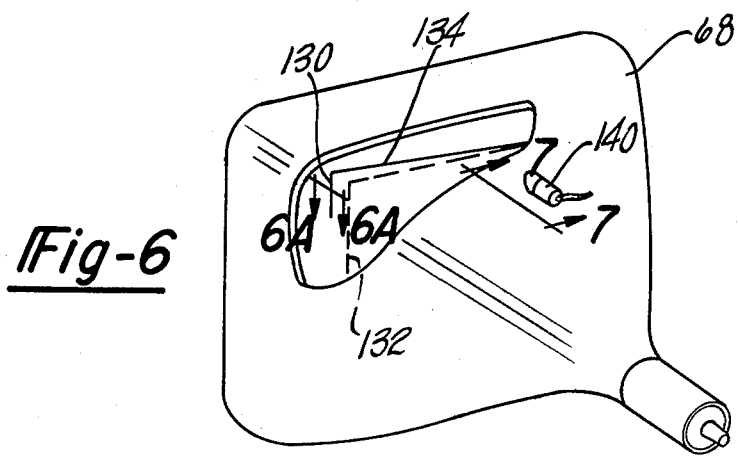
FIG. 6 is a perspective view of a cathode ray tube suitable for use with the display of FIG. 1, parts thereof being broken away in section to reveal the inside face of the display screen.
Figure 6A:
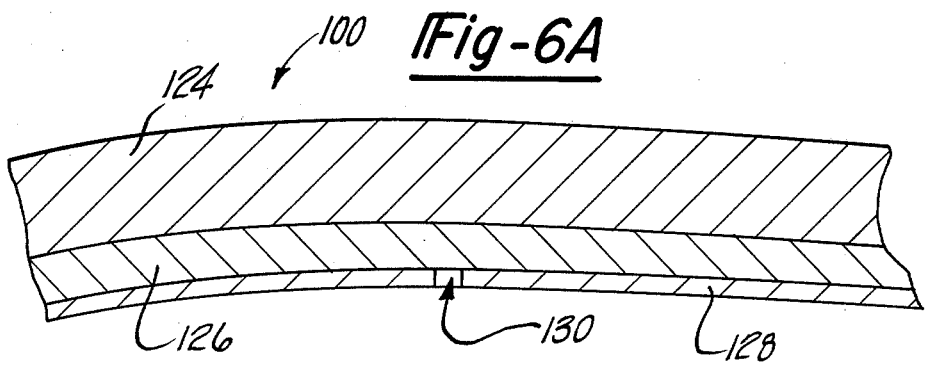
FIG. 6A is a sectional view taken along the line 6A—6A in FIG. 6.

The present invention provides a novel means of sensing the presence of vertical alignment of the scanning spots and allows appropriate adjustment of the lateral positions of the scanning spots to be made, in order to bring the same into precise vertical alignment, and in this connection, reference is also now made to FIGS. 6, 7 and 8. As shown in FIGS. 6 and 7, the CRT 68 is defined by a glass envelope 124, in which the screen 100 has a layer of fluorescent material 126, such as phosphor, on the inner face thereof. A metalized coating 128, as of aluminum, is provided on the interior face of the fluorescent layer 126 which forms a reflective surface for reflecting fluorescent light forwardly toward the viewer. The coating 128 is opaque as viewed from the inside of glass envelope 124 and prevents light from being reflected from fluorescent layer 126 inwardly to the interior of the CRT 68. A narrow, elongate, vertically extending slit 130 is provided in the metal coating 128 adjacent one lateral side of the screen 100. The vertical slit 130 is disposed horizontally within the trace path produced by at least one of the sweeps by the beam array, but is preferably spaced beyond the lateral edge of the viewing area, which is designated by the numeral 132 in FIG. 6; in this manner, the slit 130 is traversed by at least one sweep of the beam array, but yet is not visible to the viewer.

A diagonal slit 134, similar to slit 130, is provided in the metal coating 128 near the top of the screen 100, above the upper edge 136 of the viewing area. The diagonal slit 134 is inclined with respect to the vertical slit 130, and as shown in FIG. 8, is adapted to be diagonally traversed by each of the trace lines in at least the first and second sweeps of the beam array.

The CRT 68 is provided with a photodetector 138 confined in a housing 140 which is mounted on a rear wall of the envelope 124. The rear wall of the glass envelope 124 is provided with a graphite coating on opposite sides thereof, except at an area adjacent one end of the housing 140 whereat transparent conductive coatings are applied to opposite surfaces of the envelope 124. The photodetector 138 is therefore in optical communication with the interior of the glass envelope 124 and is disposed in a position to detect light emanating from the rear surface of the screen 100. An optical lens 146 may be disposed in front of the photodetector 138 within the housing 140 to magnify and focus light passing through the transparent coating 144, in order to increase the detection sensitivity of photodetector 138.

Figure 4:
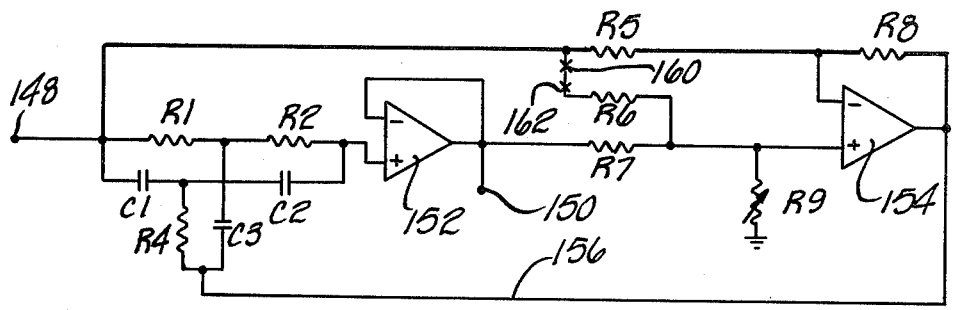
FIG. 4 is a detailed diagrammatic diagram of one form of a delay circuit suitable for use in connection with the multi-beam display of FIG. 1.
Figure 5:
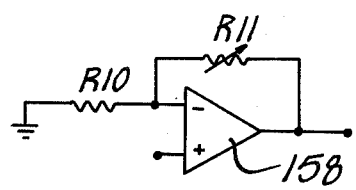
FIG. 5 is a detailed schematic diagram of an amplitude selection and equalization circuit which may be optionally employed in combination with the delay circuit of FIG. 4.

Attention is now directed to FIGS. 4 and 5 wherein one configuration of a circuit suitable for use as each of the delay circuits 44-50 is displayed. As shown in FIG. 4, the delay circuit has an input terminal 148 and an output terminal 150. A parallel-T arrangement of resistors and capacitors, consisting of resistors R1, R2 and R4, and capacitors C1, C2 and C3, is coupled within the input terminal 148 and the positive terminal of operational amplifier 152. The output of operational amplifier 152 is coupled in feedback to the negative input thereof as well as to the positive input of operational amplifier 154 through resistor R7. Resistor R9 is of the variable type and functions to allow adjustment of the amount of delay imposed upon the incoming video signals. The output of operational amplifier 154 is coupled via line 156 to the parallel-T arrangement mentioned previously, as well as to the negative input thereof through resistor R8. The negative input of operational amplifier 154 is coupled through resistor R5 to input terminal 148, and to the positive input thereof through resistors R5 and R6. Equalization and selection of amplitude may be obtained by adding the single stage operational amplifier shown in FIG. 5; in this case, the positive input of operational amplifier 158 would be coupled to terminal 160 while the output thereof would be coupled to terminal 162. The output of operational amplifier 158 is coupled through a variable resistor R11 to the negative input thereof, the negative input of operational amplifier 158 being connected to ground through resistor R10. If desired, resistor R4 may be of the variable type to permit adjustment of the center frequency of the equalizer.

Turning now to a description of the operation of the monitor, with reference being particularly made to FIGS. 1, 2, 6, 6a, 7 and 8, video signals generated by video generator circuit 24-30 are operated upon by delay circuits 44-50 and are then delivered to electron guns 78-80, after having been amplified by video amplifiers 52-58. The scanning beams 70-76 are deflected by yoke 92 to produce a plurality or array of vertically aligned, spaced apart scanning spots 102-108 on the screen 100 which are then controlled by yoke 92 to produce raster scanning of the screen 100 in the normal manner. During the first two sweeps of the scanning spot array, each of the spots 102-108 traverse the vertical slit 130 to produce fluorescense of the fluorescent layer 126 registering with vertical slit 130. The fluorescent light traveling rearwardly into the interior of the tube through vertical slit 130 is detected by photodetector 138 which produces an output signal on line 164 whose magnitude varies in accordance with the level of light which is sensed. The light level sensed by photodetector 138 varies in accordance with the number of the scanning spots 102-108 which traverse the vertical slit 130 at the same instant; thus, a maximum level of light will be sensed when all four of the scanning spots 102-108 traverse the slit 130 at exactly the same time. Assuming, for the moment, that the scanning spots 102-108 are not vertically aligned (due, for example, to deflection errors or the like), the quantity of light sensed by the photodetector 138 will be less than the predetermined, maximum level thereof corresponding to a condition of vertical alignment. The resulting signals indicative of a lack of vertical alignment are delivered via line 164 to means for automatically correcting vertical alignment, indicated by the numeral 166 in FIG. 1. Correcting means 166 may comprise a conventional control circuit having the output thereof on line 168 operatively coupled with a control input of each of the delay circuits 44-50. Correcting means 166 may comprise, for example, a conventional circuit for converting the signal on line 164 to an output signal whose voltage varies in accordance with the output of photodetector 138; resistor R9 may be of the voltage controlled type whose value varies in accordance with the magnitude of the voltage on line 168. Alternatively, the output of photodetector 138 on line 164 could be delivered to a visual or audible indicator (not shown) which simply alerts the user of an out-of-alignment condition. In this case, the user would correct the out-of-alignment condition by manually controlling certain ones of the delay circuits 44-50.

As is apparent from FIG. 8, the scanning spots 102-108 traverse the diagonally extending slit 134 at horizontally spaced locations along the first two sweeps of the scanning spot array, the points of intersection of the beam traces and the diagonal slit 134 being indicated by the short hash marks 170 in FIG. 8. As the scanning spots 102-108 traverse the diagonal slit 134, a corresponding series of light waves will be delivered through the slit 134 into the interior of the glass envelope 124 and are detected by the photodetector 138. It may be appreciated that the timing between successive light pulses sensed by photodetector 138 traveling through slit 134 is directly proportional to the vertical spacing between the scanning spots 102-108. A reduction of the vertical spacing between each of the scanning spots 102-108 increases the frequency of the light pulses, while greater spacing between the scanning spots decreases light pulse frequency. The light pulses detected by photodetector 138, which are indicative of the relative vertical spacing between the scanning spots 102-108 are converted by photodetector 138 to a train of pulses which are output on line 164 to a means for adjusting the vertical spacing between the scanning spots 102-108, which adjustment means is designated by the numeral 172 in FIG. 1. Adjustment means 172 may comprise a conventional circuit automatically controlled by the pulse train received on line 164, which circuit is operative to vary the voltage on a pair of vertical deflection plates 174. Vertical deflection plates 174, in turn, control the vertical spacing between the scanning spots 102-108.

It is appropriate to note at this point that, although the vertical and diagonal slits 130 and 134 respectively have been disclosed herein for detecting vertical alignment and spacing of the scanning spots 102-108, alternate means may be employed to perform this same function. For example, either of the slits 130 and 134 may be replaced by conductive, thin wire elements which themselves produce the necessary output signals when impinged by the beams 70-76. Also, alignment can be achieved by providing a video test pattern (such as cross-hatching and/or diagonal lines) and making the appropriate adjustments based on visual inspection of the image, using the naked eye or an optical system.

Although the display monitor of the present invention discussed above is indicated as employing a raster scan pattern wherein scanning commences at the upper left hand corner of the viewing screen, it is to be noted that the present invention is readily adaptable for commencing scanning in any one of the four corners of the screen and may proceed in any of four directions. For example, the beginning of each scanning frame might commence at the lower right hand corner of the screen and proceed vertically upward on each successive sweep, or, scanning of each frame might commence at the lower right hand corner of the screen and proceed horizontally toward the left thereof on each successive sweep. Thus, while the terms "vertical" and "horizontal" are used herein to respectively designate the alignment axis of scanning spots 102-108 and the direction of scanning, it is to be understood that these terms are relative and the directions thereof are dependent on the frame of references established by the particular scanning pattern selected.

As indicated in FIG. 3, successive sweeps are vertically spaced apart a distance "S", the distance S being determined by the amplitude of the vertical sweep signal. Normally, it will be desirable to have the distance S equal distance B. In some cases it may be desirable to reduce vertical spacing between each beam B, to a value less than the width WB, of each beam in order to produce overlapping of the traces produced by each beam.

Figure 10:
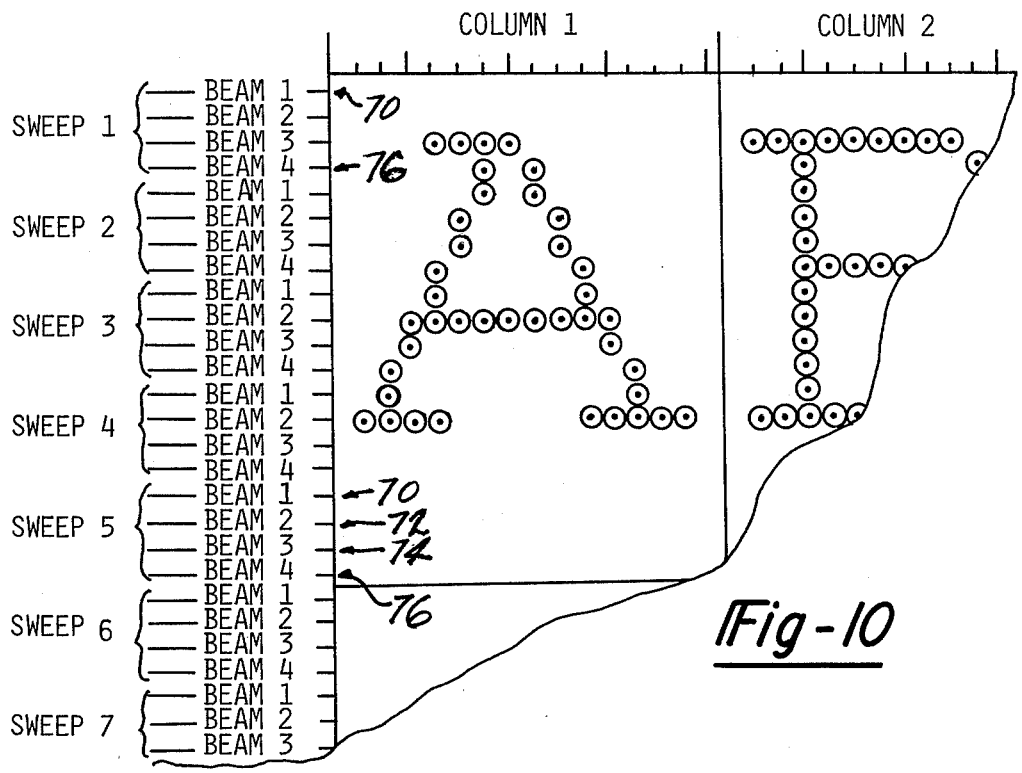
FIG. 10 is a fragmentary, front view of the display screen showing a series of characters generated by the circuit of FIG. 9.

Attention is now directed to FIGS. 9 and 10 which relate to a system for generating alphanumeric characters suitable for use in connection with the display monitor previously described. The character generation system is driven by clock 176 whose pulse output is divided by a series of counters 178-184 in order to provide a plurality of sources of pulse trains, each having different pulse timing. A refresh memory control 186 receives timing signals from counters 180 and 184 respectively corresponding to the column and text line addresses, and further interfaces with an external means (not shown) such as a keyboard to provide user control. The memory control 186 provides memory address signals, data signals and control signals to a refresh memory 188 which has stored therein character codes or designations corresponding to each character which may be displayed on the monitor. Character codes are delivered on an output bus 190 to the character address inputs of a plurality of matrix memories, respectively designated by the numerals 190–196. Each of the memories 190–196 includes a sweep address input which is coupled by a data bus to the output of counter 182. In operation, a character code output from refresh memory 188 on data bus 190 is simultaneously delivered to the character addresses of each of the matrix memories 190–196. Each of the matrix memories 190–196 has stored therein portions of the data necessary to generate a given character and deliver character data on their outputs to respectively corresponding shift registers 198–204. Each of the shift registers 198–204 has a dot clock input coupled to the output of clock 176 and a load clock output coupled to the output of counter 178. Shift registers 198–204 output the respectively corresponding portions of the character data on the corresponding video lines 206–212 which are operably coupled with the display monitor, and more particularly to the inputs of delay circuits 44–50 shown in FIG. 1. From the foregoing, it may be appreciated that the data for producing each character is sliced or divided up into a plurality of portions which are stored in respectively corresponding, discrete memories, which memories may be addressed using a signal character code or designation. The resulting image display on the monitor screen is shown in FIG. 10 where it can be seen that each text line comprises five sweeps of the beam array to produce twenty traces or lines, each column corresponding to a particular character being divided into sixteen separate display dots.

Figure 11:
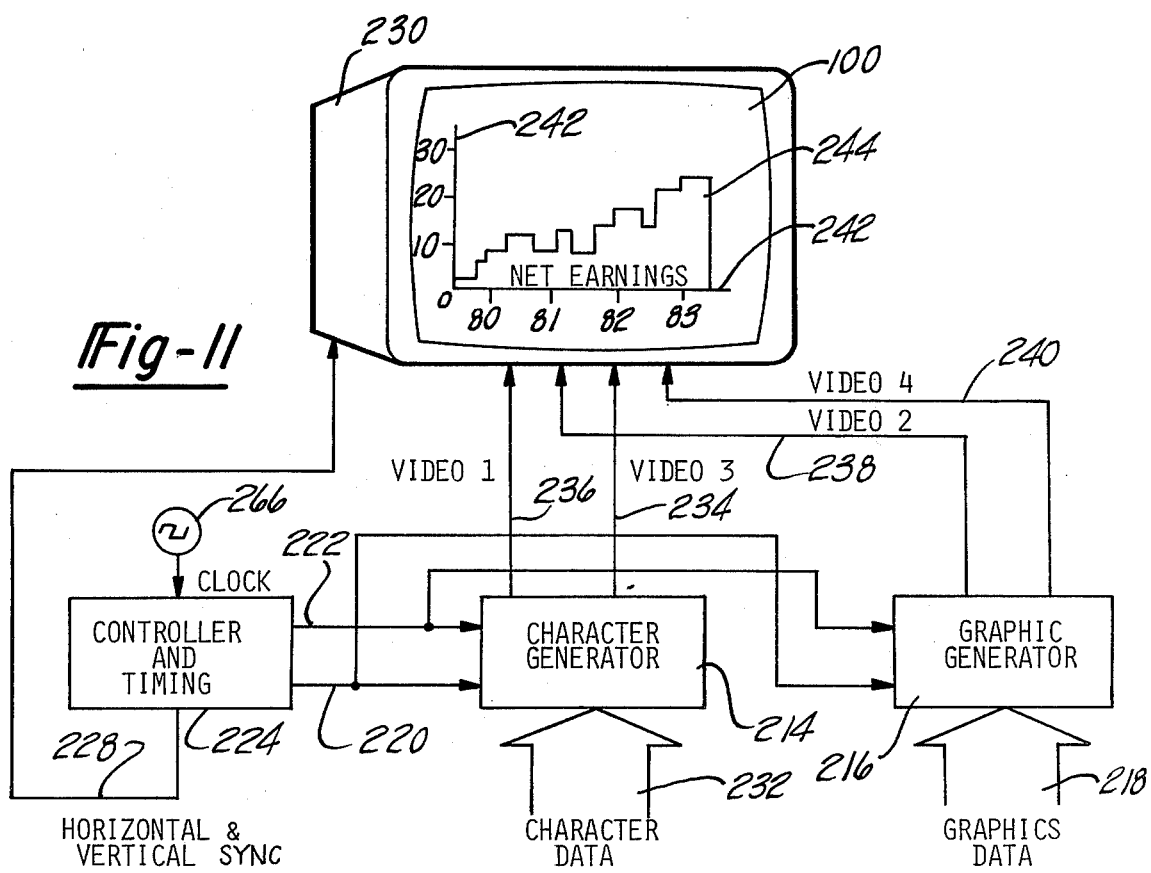
FIG. 11 is a combined block diagram and front view of the display screen, illustrating a method of interlacing character and graphic images on the display screen.
Figure 12:
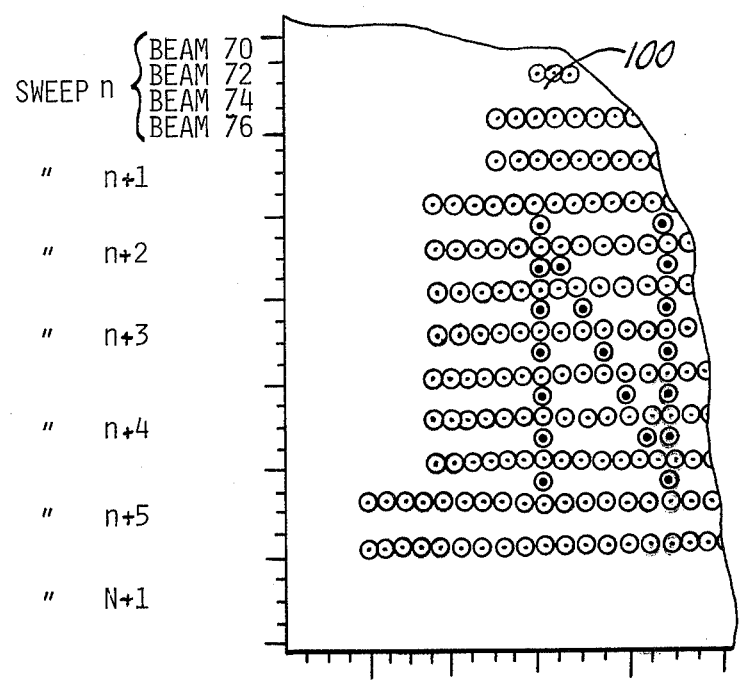
FIG. 12 is an enlarged view of a portion of the screen depicted in FIG. 11.

Referring now to FIGS. 11 and 12, the multibeam display monitor of the present invention is suitable for use in practicing a novel method of simultaneously displaying alphanumeric and graphical data so as to give an impression of superimposition on the display screen. A character generator 214, either of conventional design or of the type described immediately above, is employed in cooperation with a graphics generator 216. Graphics generator 216 will typically include a controllable input (not shown) coupled with a bus 218 for receiving coded graphics information corresponding to particular graphics or pictorial information to be displayed. Character generator 214 and graphics generator 216 are controlled by a pair of timing inputs 220 and 222 derived from controller and timing circuitry 224 of the conventional type which is driven by a clock 226. Controller and timing circuitry 224 also provides horizontal and vertical sync pulses on output line 228 to the display monitor broadly designated by numeral 230. Character generator 214 is controlled by a suitable control (not shown) which delivers coded character designations on hub 232 in a manner similar to that described previously. The output of character generator 214 is delivered on video lines 234 and 236 to the display monitor 230, and more particularly to the respective inputs of one pair of delay circuits 44–50. The video signal outputs of graphic generator 216 are delivered on video lines 238 and 240 to the respective inputs of the other pair of delay circuits 44–50. Thus, it may be appreciated that video signals corresponding to character type information is processed by two "channels" of the multi-beam display monitor, while graphics information is processed by the other two "channels" thereof. The result of this method of information processing is shown in a typical example of a display pattern shown on the screen 110 in FIGS. 11 and 12 wherein the axes 242 and stair-step chart 244 represent graphics information generated by two channels of the display monitor and derived from graphics generator 216, while the remaining alphanumeric information is produced by the other two channels and is derived from the character generator 214. As is apparent from the simulated displays on screen 100, the graphics and character type images give the impression of being superimposed. This overlay effect of graphics and character information may be accomplished by delivering the respective character and graphics video signals to alternate channels of the display monitor. For example, as shown in FIG. 12, on the first sweep of the beam array, beams 70 and 74 produce graphics information while beams 72 and 76 do not produce any image whatsoever. On the third sweep of the beam array (sweep $_{n+2}$) beams 70 and 74 continue to produce graphics information while beams 72 and 76 produce character information which is interlaced on alternate lines with the graphics information.

Figure 13:
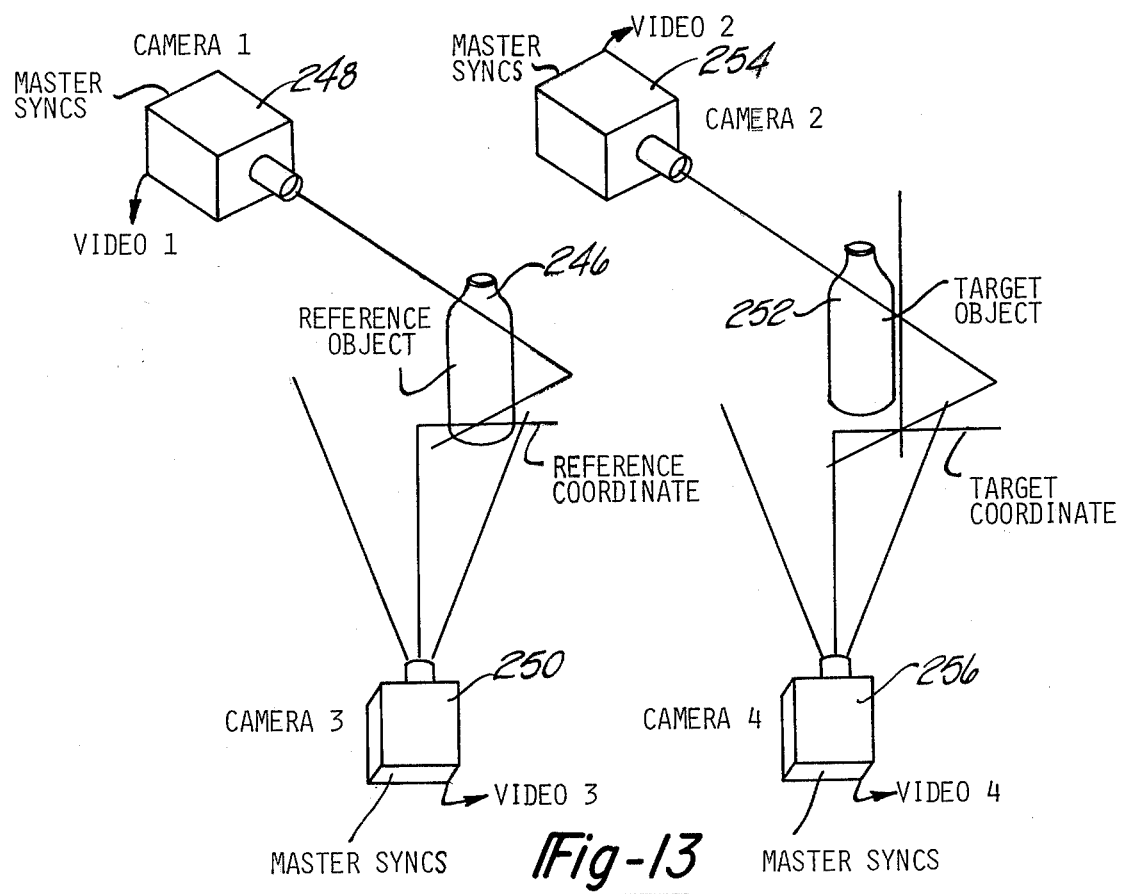
FIG. 13 is a perspective view of an arrangement for producing separate video signals representing different reference objects.
Figure 14:
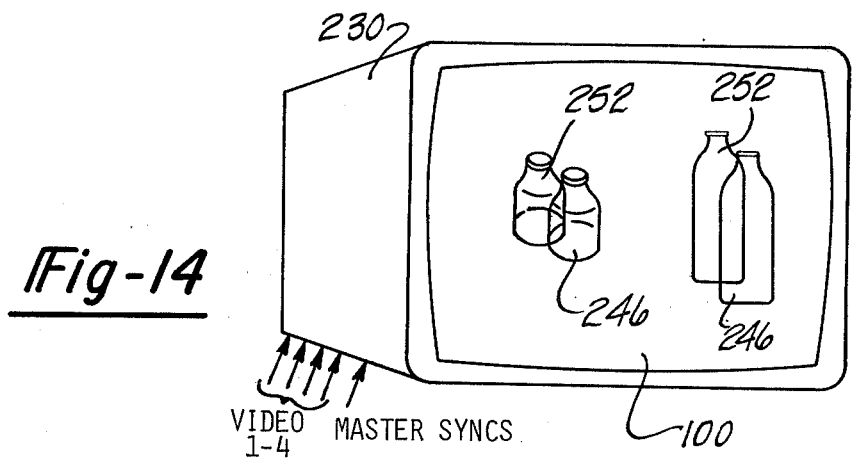
FIG. 14 is a front view of the display screen showing the interlaced, superimposed images created in accordance with the present invention, which correspond to the reference objects of FIG. 13.

By virtue of the use of independent video channels of the present multi-beam scan monitor, a novel method of displaying superimposed images produced from separate data sources, such as television cameras, is possible. This method is particularly useful for noncontact position sensing of a target object, as illustrated in FIGS. 13 and 14. As shown in FIG. 13, a reference object 246 is viewed by a first and second television camera 248 and 250 respectively, from preselected, known positions relative to the position of reference object 246. The video outputs are respectively operatively coupled with an alternate pair of video channels of the display monitor 230. Simultaneously, a target object 252 is viewed by a pair of cameras 254 and 256 from preselected positions relative to the target object 252. The video outputs of cameras 254 and 256 are respectively operably coupled to the remaining alternate pair of video channels of the display monitor 230. As shown in FIG. 14, the reference and target objects 246 and 252 are displayed in superimposed relationship by two separate sets of images thereof corresponding to the viewing positions of cameras 248, 250, 254 and 256. More particularly, the target object 252 displayed on the left hand side of screen 100 corresponds to the image televised by camera 254; the reference object 246 on the left hand side of screen 100 corresponds to the image televised by camera 248; target object 252 shown on the right hand side of screen 100 corresponds to the image televised by camera 256, and; the image of reference object 246 shown on the right hand side of screen 100 corresponds to that televised by camera 250. Each of the cameras 248, 250, 254 and 256 are synchronized in their timing, relative to each other.

With the arrangement described above, the positions of the images of the reference and target objects 246 and 252 shown on screen 100 correspond exactly to the actual positions of such objects themselves; any deviation of the position of the target object 252 will result in the apparent movement of at least one of the two images thereof shown on screen 100. In lieu of the reference object 246 and corresponding cameras 248 and 250, a suitable reference image may be created on screen 100 using artificial images generated by graphic data stored in a memory.

Figure 15:
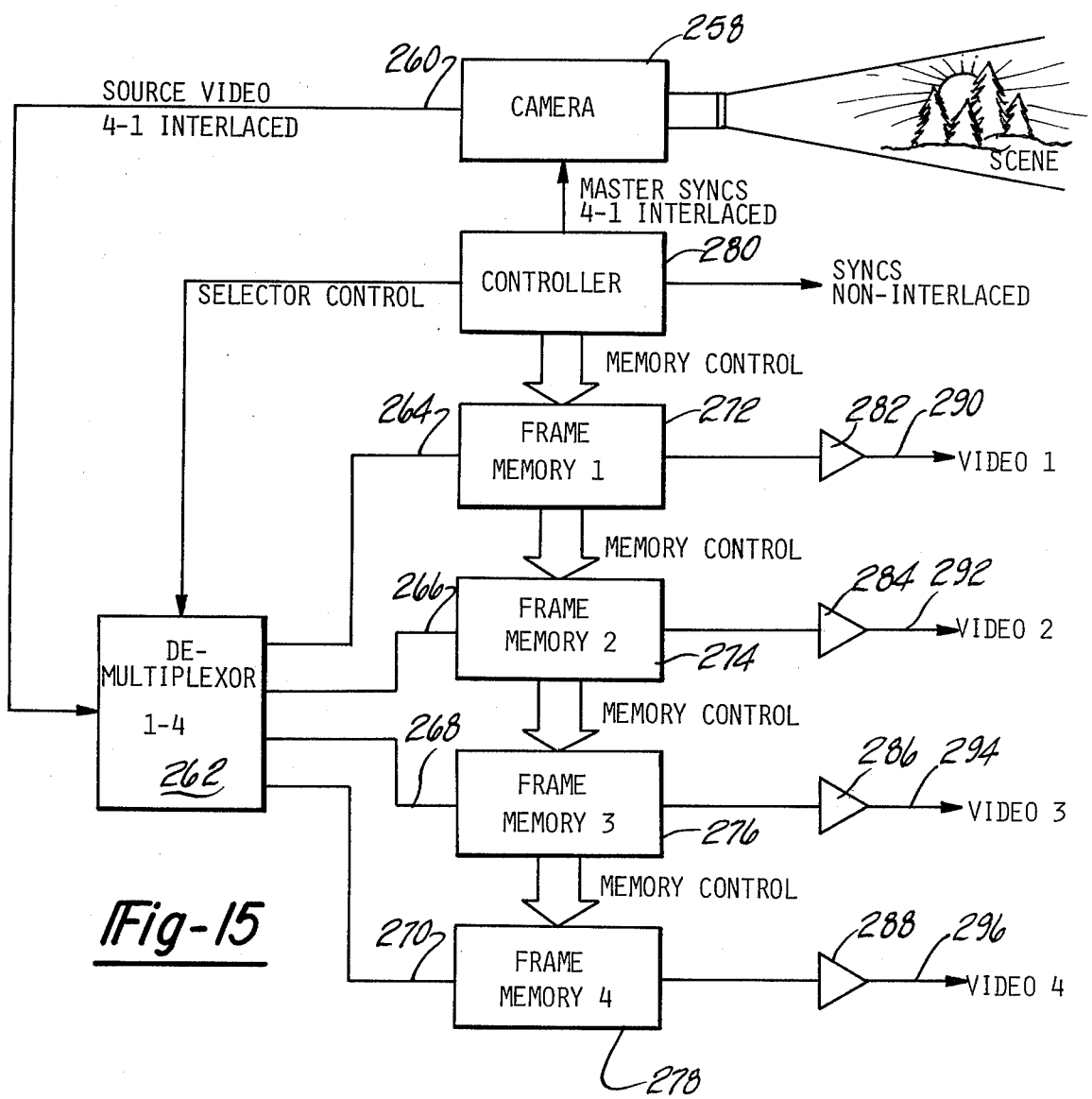
FIG. 15 is a combined block diagram and diagrammatic view of an arrangement for producing high resolution video signals, using a high resolution camera, suitable for display by the monitor of the present invention.

Still another significant application of the present multi-beam raster scan display monitor involves its use in combination with many types of currently available television cameras which possess a resolution capability exceeding conventional display monitors. As shown in FIG. 15, a high resolution television camera 258 of the type having 4–1 interlace scanning delivers a multiplex output on line 260 consisting of four individual video signals. A demultiplexer 262 separates the individual video signals and respectively delivers the same on output lines 246–270 to the inputs of respectively corresponding frame memories 272–278, wherein video signals corresponding to respectively associated frames recorded by the camera 258 are stored. A controller 280 is operatively coupled to the camera 258, demultiplexer 262, and each of the memories 272–278, for controlling data transfer. The video signal outputs representing each frame recorded by the camera 258 are then respectively amplified by amplifiers 282–288 and delivered on lines 290–296 to respectively corresponding channels of the multi-beam display monitor which simultaneously displays all four frames recorded by the camera 258 in a single scanning frame of the display monitor. Each of the frame memories 272–278 are updated with video signal information once for every four picture frames recorded by camera 258.

In view of the foregoing, it is apparent that the multi-beam raster scan display monitor system of the present invention not only provides for reliable accomplishment of the objects of the invention but does so in a particularly simple and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A high definition raster scan image display system, comprising:
  a cathode ray tube including a screen on which images may be displayed,
  said cathode ray tube further including means for producing a plurality of individual electron beams defining an array thereof adapted to scan said screen to produce images thereon, said beams in said array thereof being vertically spaced apart a predetermined distance at the corresponding points of impingement thereon on said screen;
  a plurality of individual sources of video signals respectively associated with said plurality of electron beams and operatively coupled with said beam producing means;
  means for directing each of said beams in said array thereof onto said screen and for causing said beam array to scan said screen; and
  means operatively coupled with said beam producing means and with said plurality of video signal sources for adjusting the vertical alignment of the beams in said array thereof at said corresponding points of impingement of said beams on said screen during scanning by said beam array.

2. The system of claim 1, wherein said adjusting means comprises circuit means for altering the relative timing of the video signals delivered from each of said sources thereof to said beam producing means, said circuit means having an input coupled to each of said sources of video signals and an output coupled to said beam producing means.

3. The system of claim 2 wherein said circuit means includes adjustable means for delaying video signals delivered thereto from certain ones of said sources thereof for selectable time periods.

4. The system of claim 3 wherein said circuit means comprises a two stage amplifier having the output thereof operably coupled in a feedback loop to input thereof, and said adjustable delaying means comprises a variable resistor coupled between the individual stages of said two stage amplifier.

5. The system of claim 1, further including means for detecting vertical alignment of the beams in said array thereof at said points of impingement thereof on said screen.

6. The system of claim 5, wherein said vertical alignment detection means comprises:
  means adjacent said screen for sensing the presence of each of said beams in said array thereof along a vertically extending reference axis on said screen and for producing an output in accordance with the number of beams simultaneously sensed thereby, and
  means operatively associated with said beam sensing means for receiving said output from said beam sensing means and for producing control signals in accordance with said output.

7. The system of claim 6, wherein said receiving and control signal producing means is operatively coupled with said circuit means, said circuit means being controlled by said receiving and control signal producing means and operative to alter the relative timing of said video signals delivered to said beam producing means in accordance with said control signals.

8. The system of claim 6, wherein:
  said screen is provided with respectively superimposed layers of a fluorescent and opaque materials thereon, and
  said sensing means comprises an elongate, vertically extending slit in said opaque layer of material, and a photodetector disposed on one side of said opaque layer of material opposite said layer of fluorescent material, said photodetector being operable for detecting fluorescent light produced by said fluorescent material and delivered through said slit when any of said beams is vertically aligned with said slit.

9. The system of claim 6, wherein said sensing means comprises an elongate, vertically extending wire member disposed adjacent said screen and positioned generally parallel thereto.

10. The system of claim 1, further including means operatively coupled with said beam producing means for selectively adjusting said predetermined distance between the beams in said array thereof.

11. The system of claim 10, wherein said means for selectively adjusting said predetermined distance includes:
  means adjacent said screen for sensing the presence of each of said beams in said array thereof along a reference axis on said screen inclined from vertical, said sensing means being operative to produce an output upon sensing the presence of said beams along said reference axis, and
  means operatively associated with said beams sensing means for receiving said output from said sensing means and for producing timing signals in accordance with said output.

12. The system of claim 11, wherein said means for selectively adjusting said predetermined distance further includes:

means operatively coupled with timing signal producing means for generating control signals in accordance with the relative timing of said timing signals, and means adjacent said tube and operatively coupled with control signal generating means for deflecting said beams in said array thereof in accordance with said control signals whereby to adjust said predetermined distance between said beams in said predetermined array thereof.

13. The system of claim 12, wherein:

said screen is provided with respectively superimposed layers of a fluorescent and opaque materials thereon, said sensing means comprises an elongate slit in said opaque layer of material, and said output receiving means comprises a photodetector disposed in light detecting relationship to said slit and on one side of said opaque layer of material opposite said layer of fluorescent material, said photodetector being operable for detecting fluorescent light produced by said fluorescent layer and delivered through said slit when said beams are aligned with said slit.

14. The system of claim 13, wherein said beam deflection means comprises an electrostatic lens.

15. The system of claim 13, wherein said deflection means comprises an electro-magnetic lens.

16. A system for displaying high resolution images formed from a plurality of individual alphanumeric character displays, comprising:

a cathode ray tube having a screen for displaying said images thereon, said tube including means for producing a plurality of individual electron beams defining an array thereof, and means for causing said beam array to scan said screen;

means operably coupled with said beam producing means for producing a plurality of sets of video signals, each of said sets being operative for modulating a corresponding one of said beams, said video signal producing means including means for generating the character to be displayed on said screen, said last named means including:

(1) a refresh memory for storing character designation data incoming to the system, (2) a plurality of discrete matrix memories each having the inputs thereof operatively coupled with said refresh memory and having addressable storage locations adapted to store video signal producing information corresponding to the characters to be displayed, each of said matrix memories being addressable by the identical character designation received from said refresh memory.

17. The system of claim 16, wherein said character generating means includes a plurality of shift registers respectively coupled with said plurality of discrete matrix memories for temporarily storing the video signal producing information output by the corresponding one of said matrix memories.

18. A method of generating high definition images using a cathode ray tube, comprising the steps of:

(A) producing a plurality of electron scanning beams;

(B) modulating each of said beams using a respectively associated, independent source of video signals;

(C) directing said plurality of said scanning beams onto the display screen of said tube to form an array of scanning spots on said screen;

(D) producing raster scanning of said screen using said array of scanning spots; and (E) maintaining the scanning spots in said array thereof in substantially precise, vertical alignment with each other during the scanning step by sensing the vertical alignment of said beams and adjusting the position of the beams relative to each other in accordance with the sensed vertical alignment.

19. The method of claim 18, wherein step (E) is performed by the substeps of:

sensing the number of said scanning spots simultaneously aligned with respect to a vertical reference axis on said screen, and altering the timing of at least certain ones of said video signals in accordance with the sensed number of said scanning spots in a manner to bring all of said scanning spots into alignment with said axis at essentially the same time.

20. The method of claim 19, wherein step (E) is further performed by the substep of:

producing a control signal whose magnitude is indicative of the sensed number of said scanning spots, and the substep of altering the timing of said certain ones of said video signals is performed continuously in accordance with the magnitude of said control value.

21. The method of claim 19, wherein the substep of altering the timing of said certain ones of said video signals is performed by the substep of delaying said certain ones of said video signals.

22. The method of claim 18, including the steps of:

(F) sensing the vertical spacing between said scanning spots, (G) producing an electrical signal indicative of the magnitude of the spacing sensed in step (F), and (H) adjusting said vertical spacing.

23. The method of claim 22, wherein step (H) is performed by the substep of deflecting the paths of travel of each of said beams toward said screen.

24. A method of generating superimposed images using a cathode ray tube, comprising the steps of:

(A) producing a first set of video signals corresponding to a first image to be displayed on the display screen of said tube;

(B) producing a second set of video signals corresponding to a second image to be displayed on the display screen of said tube;

(C) producing first and second electron beams respectively associated with said first and second sets of video signals;

(D) directing said first and second electron beams toward said screen in a manner to provide a pair of corresponding, vertically aligned scanning spots on said screen;

(E) horizontally scanning successive lines of said screen using said pair of said scanning spots to produce an interlaced display on said screen forming superimposed images thereon, said first image being formed by one of said scanning spots, said second image being formed by the other of said scanning spots in said pair thereof.

* * * * *